United States Patent
Cady

(10) Patent No.: US 10,350,520 B2
(45) Date of Patent: Jul. 16, 2019

(54) SYSTEM AND METHOD FOR USING A PRESSURE DIFFERENTIAL FOR SEPARATION

(71) Applicant: M-I L.L.C., Houston, TX (US)

(72) Inventor: Eric Cady, Walton, KY (US)

(73) Assignee: M-I L.L.C., Houston, TX (US)

( * ) Notice: Subject to any disclaimer, the term of this patent is extended or adjusted under 35 U.S.C. 154(b) by 359 days.

(21) Appl. No.: 14/777,363

(22) PCT Filed: Mar. 17, 2014

(86) PCT No.: PCT/US2014/030428
§ 371 (c)(1),
(2) Date: Sep. 15, 2015

(87) PCT Pub. No.: WO2014/145630
PCT Pub. Date: Sep. 18, 2014

(65) Prior Publication Data
US 2016/0038858 A1    Feb. 11, 2016

Related U.S. Application Data

(60) Provisional application No. 61/798,599, filed on Mar. 15, 2013.

(51) Int. Cl.
*B01D 33/82*    (2006.01)
*E21B 21/06*    (2006.01)
(Continued)

(52) U.S. Cl.
CPC .......... *B01D 33/82* (2013.01); *B01D 33/0376* (2013.01); *B01D 33/41* (2013.01);
(Continued)

(58) Field of Classification Search
CPC .... B01D 33/82; B01D 33/0376; B01D 33/48; B01D 33/41; B01D 2201/204;
(Continued)

(56) References Cited

U.S. PATENT DOCUMENTS 8,613,360 B2    12/2013    Carr
2005/0183994 A1    8/2005    Hensley et al.
(Continued)

OTHER PUBLICATIONS

International Search Report and Written Opinion for the equivalent International patent application PCT/US2014/030428 dated Aug. 13, 2014.
(Continued)

*Primary Examiner* — David C Mellon
*Assistant Examiner* — Liam Royce
(74) *Attorney, Agent, or Firm* — Jeffrey D. Frantz

(57) ABSTRACT

A shaker separates components of a slurry. The shaker has a screen with a pressure differential applied to the screen to remove a portion of a slurry. The pressure differential across the screen can be toggled or pulsed. Generally, various types of separators are used to separate liquids and solids. For example, oil-field drilling operations use separators with screens to remove solids from a slurry. One type of apparatus used to remove solids from drilling mud is commonly referred to in the industry as a "shale shaker."

11 Claims, 3 Drawing Sheets

(51) Int. Cl.
*B01D 33/48* (2006.01)
*B01D 33/41* (2006.01)
*B01D 33/03* (2006.01)
*B07B 13/16* (2006.01)
*B07B 1/46* (2006.01)

(52) U.S. Cl.
CPC ............... *B01D 33/48* (2013.01); *B07B 1/46* (2013.01); *B07B 13/16* (2013.01); *E21B 21/065* (2013.01); *E21B 21/066* (2013.01); *B01D 2201/204* (2013.01)

(58) Field of Classification Search
CPC ..... E21B 21/065; E21B 21/066; B07B 13/16; B07B 1/46
See application file for complete search history.

(56) References Cited

U.S. PATENT DOCUMENTS

| | | | |
|---|---|---|---|
| 2008/0078699 A1* | 4/2008 | Carr | E21B 21/065 209/233 |
| 2010/0089652 A1 | 4/2010 | Burnett | |
| 2011/0089122 A1* | 4/2011 | Smith | B01D 33/04 210/774 |
| 2012/0279932 A1 | 11/2012 | Pomerleau | |

OTHER PUBLICATIONS

International Preliminary Report on Patentability for the equivalent International patent application PCT/US2014/030428 dated Sep. 15, 2015.

* cited by examiner

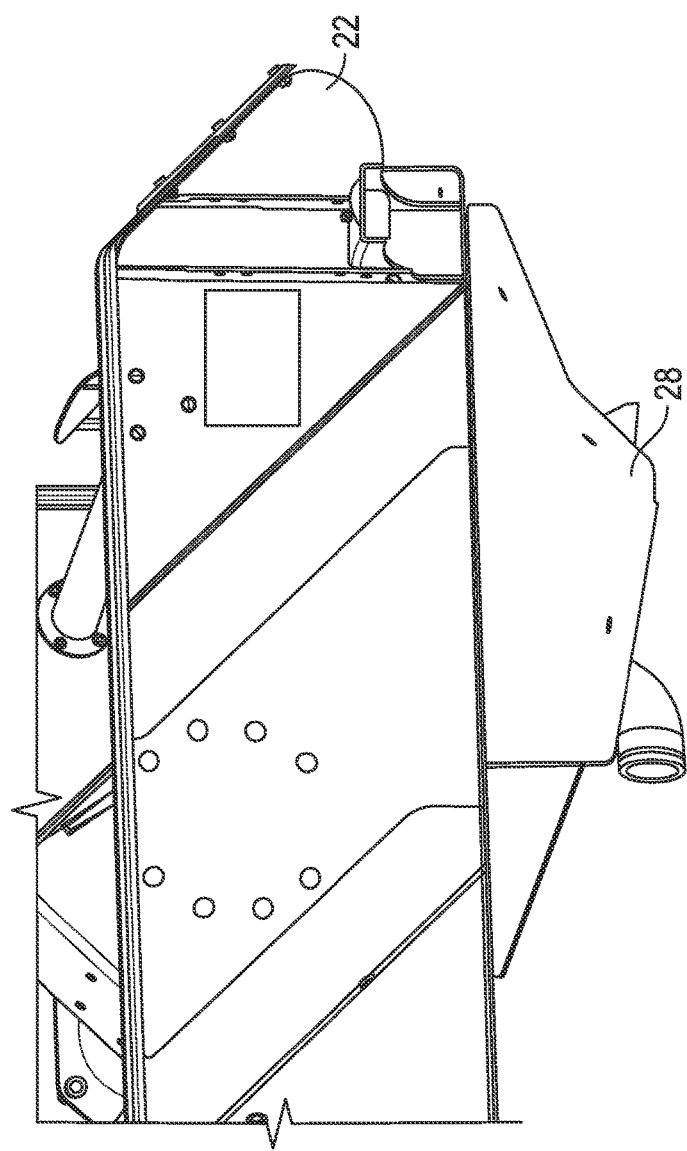

SYSTEM AND METHOD FOR USING A PRESSURE DIFFERENTIAL FOR SEPARATION

BACKGROUND OF THE INVENTION

Generally, various types of separators are used to separate liquids and solids. For example, oilfield drilling operations use separators with screens to remove solids from a slurry. One type of apparatus used to remove solids from drilling mud is commonly referred to in the industry as a "shale shaker." A shale shaker, also known as a vibratory separator, is a vibrating sieve-like device upon which returning used drilling mud is deposited and through which substantially cleaner drilling mud emerges.

Oilfield drilling fluid, often called "mud," serves multiple purposes in the industry. Drilling mud acts as a lubricant to cool rotary drill bits and facilitate faster cutting rates. Furthermore, the drilling mud counterbalances pressure encountered in subterranean formations. Various weighting and lubrication agents are mixed into the drilling mud to obtain the correct mixture for the type and construction of the formation to be drilled. Because the mud evaluation and/or mixture process may be time consuming and expensive, drillers and service companies prefer to reclaim and reuse the returned drilling mud. Another significant purpose of the drilling mud is to carry the cuttings away from the drill bit to the surface. In the wellbore, the cutting solids enter the drilling mud and must be removed before the drilling mud may be reused.

Typically, shale shakers use filtration screens to separate drill cuttings from drilling fluid in on-shore and off-shore oilfield drilling. The separating screens have a mesh stretched across a frame. The mesh allows particles and/or fluid below a predetermined size to pass through the separating screen. One or more vibration motors are connected to the frame of the separating screen. The separating screen is vibrated while the mixture of particles and/or fluids is deposited on an input side. The vibration improves separation and conveys the remaining particles to a discharge end of the separating screen.

The particles that do not pass through the mesh may be introduced to additional processing equipment, such as dryers, hydrocyclones, centrifuges and/or thermal desorption systems. Additionally, particles that do not pass through the mesh are collected in a bin and/or a pit. The particles and/or fluid that pass through the mesh are collected in a pan and/or a sump below the separating screen.

The slurry is poured onto a back end of the vibrating screen, flowing toward the discharge end of the basket. Large particles that are unable to move through the screen remain on top of the screen and move toward the discharge end of the basket where they are collected. The fluids flow through the screen and collect in a reservoir beneath the screen.

A continuing desire exists for shakers having increased fluid capacity, increased fluid flow-through rates across the screens, and/or improved fluid removal efficiencies.

BRIEF DESCRIPTION OF DRAWINGS

FIG. 2A is a schematic diagram of a shaker basket and a sump according to embodiments disclosed herein.

DETAILED DESCRIPTION

Figure 1:
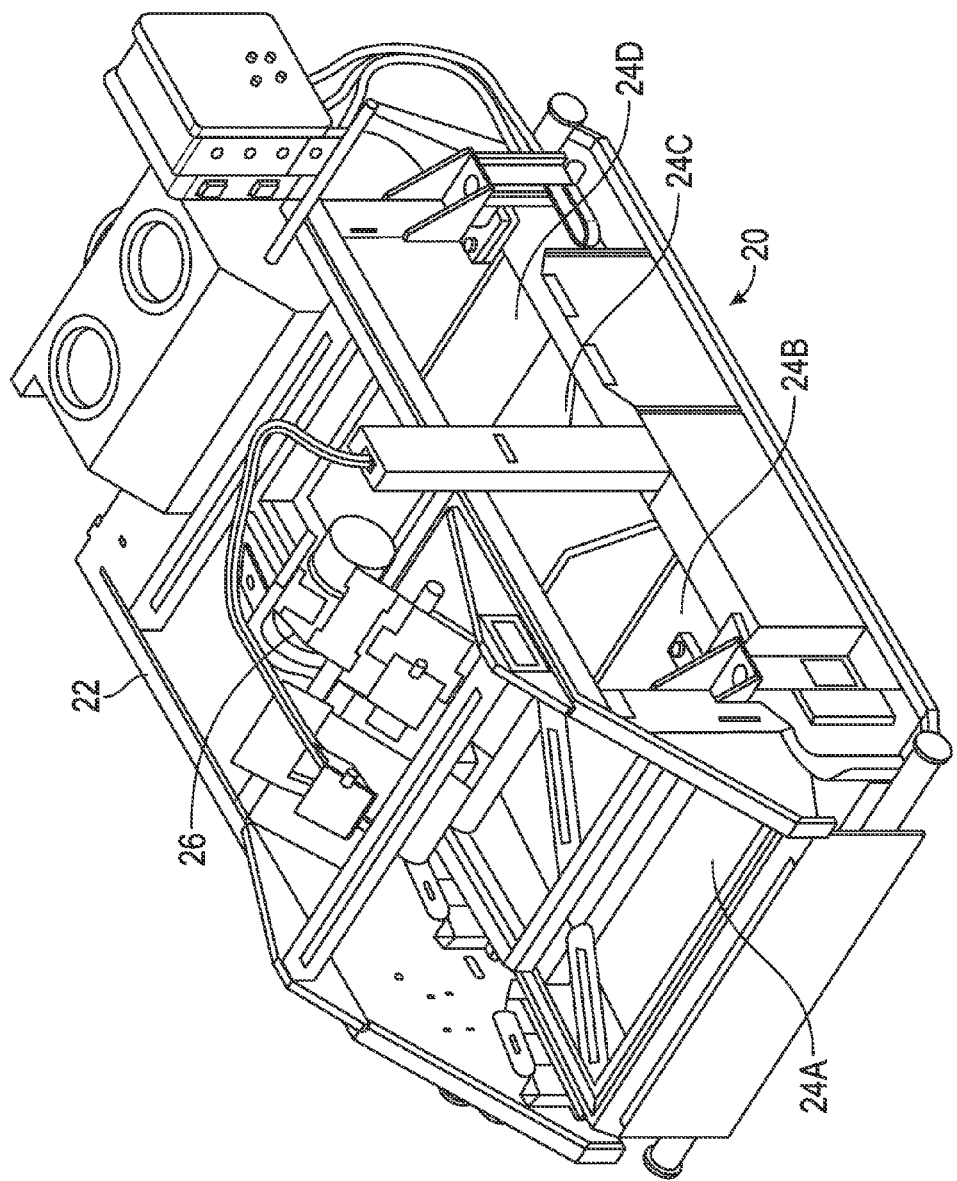
FIG. 1 is a perspective view of a shaker according to embodiments disclosed herein.

Embodiments disclosed herein are applicable to separation devices that may be utilized in numerous industries. While specific embodiments may be described as utilized in the oilfield industry, such as use with shale shakers, the device may be applicable in other industries where separation of liquid-solid, solid-solid and other mixtures may require separation. The embodiments, for example, may be utilized in the mining, pharmaceutical, food, medical or other industries to separate such mixtures.

In the following detailed description, reference is made to accompanying drawings, which form a part hereof. In the drawings, similar symbols or identifiers typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined and designed in a wide variety of different configurations, all of which are explicitly contemplated and form part of this disclosure.

Figure 2B:
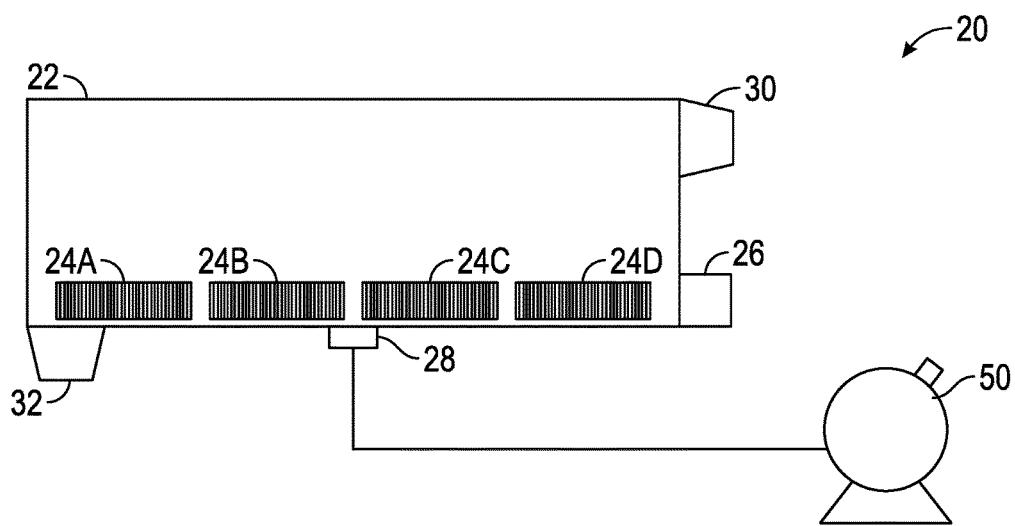
FIG. 2B is a schematic diagram of a shaker and a pressure differential device according to embodiments disclosed herein.

FIG. 1 illustrates one embodiment of a shaker 20, preferably a vibratory shaker. The shaker 20 may have screens 24A, 24B, 24C and 24D mounted in a basket 22 for separating solids from a slurry. As used herein, a slurry refers to a mixture of at least two components, such as fluid and solid. FIG. 2B also illustrates the shaker 20. The shaker 20 may include any number of screens. FIG. 2B shows the shaker 20 with four screens, 24A, 24B, 24C and 24D. A vibrator 26 may be mounted to the shaker 20 for vibrating the screens 24A, 24B, 24C and 24D. The vibrator 26 may be any device capable of imparting acceleration and force on the basket 22 of the shaker 20. The vibrator 26 may comprise a plurality of motors or other devices capable of imparting a desired motion and acceleration on the basket 22. The shaker 20 may include a sump 28, as shown in FIGS. 2A and 2B, mounted below screens 24A, 24B, 24C and 24D for collecting fluid that passes therethrough.

An inlet end 30 of the shaker 20 may be positioned at one end of the basket 22. A discharge end 32 of the shaker 20 may be positioned at an opposite end and may receive material from the sump 28 for discharge. Material not passing through the screens 24 may be discharged off the end of the screen 24 and collected. The material flows across screens 24D, 24C, 24B and 24A in that order, flowing from the inlet end 30 toward the discharge end 32. As depicted in FIGS. 1 and 2B, flow across the screen plane is from right to left. At the discharge end 32, material not passing through the ends may be collected for disposal and/or further processing. Fluid that may have passed through the screens 24A, 24B, 24C and 24D as the mud may move along the screens 24A, 24B, 24C and 24D may be collected in the sump 28 and/or may be sent for further processing and/or re-use.

A pressure differential device 50 (shown in FIGS. 2B and 3) may be provided to create a pressure differential between the space above and below the screens 24A, 24B, 24C and 24D. The pressure differential device 50 may cause fluid to flow through the screens 24A, 24B, 24C and 24D and to the sump 28. The sump 28 may be fluidly connected to a tank, such as an accumulator, which may be positioned between the pressure differential device 50 and the sump 28. In such an embodiment, the pressure differential device 50 may pull gas, such as air, or fluid from the tank or accumulator to create a pressure differential through the screens 24A, 24B, 24C and 24D. As a non-limiting example, the pressure differential device 50 may be connected to an accumulator or tank (not shown) that, in turn may be connected to the sump 28. In such an embodiment, the pressure differential device 50 can pull or otherwise remove air from the tank or the accumulator to create a pressure differential through the screens 24A, 24B, 24C and 24D such that fluid is forced into the sump 28. Advantageously, the amount of fluid forced into the sump 28 as a result of the pressure differential can be more than the amount of fluid that would flow into the sump 28 without use of the pressure differential device 50.

The pressure differential device 50 may comprise, in an embodiment, pumps that may be used to create the pressure differential or vacuum may be, reciprocating pumps, centrifugal pumps, vacuum pumps, pneumatic pumps, electric pumps, air pumps, piston pumps, rotary piston pumps, rotary vane pumps, screw pumps, scroll pumps, liquid ring pumps, external vane pumps, Wankel pumps, Toepler pumps and/or the like. In another embodiment, the pressure differential may be created by a positive displacement pump and/or a momentum transfer pump and/or an entrapment pump.

Figure 3:
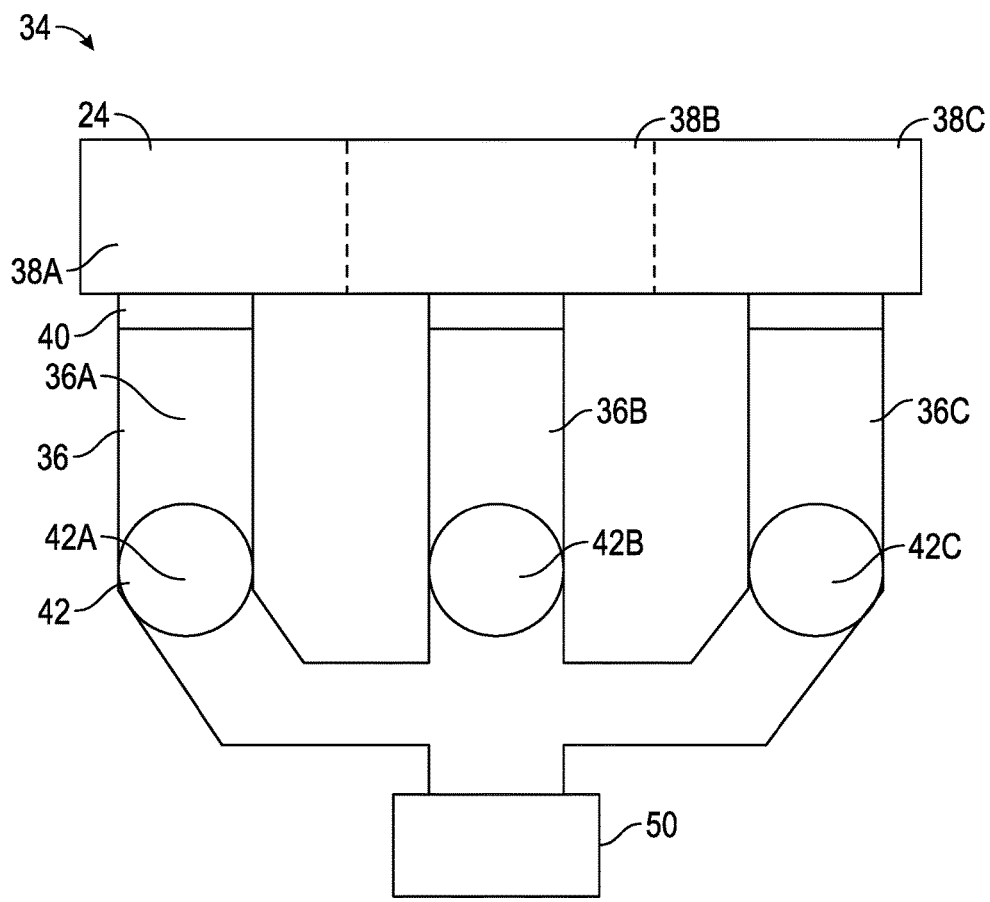
FIG. 3 is a schematic diagram of a system having a pressure differential device for use in a shaker according to embodiments disclosed herein.

Referring now to FIG. 3, a subsystem 34 of the shaker 20 is shown. The subsystem 34 may have screen 24, channels 36 that may be operatively coupled to the screen 24, and the pressure differential device 50 fluidly connected to the channels 36. The channels 36 may facilitate the flow of fluid, liquid, vapor and/or any other material passing through the screen 24. For example, the amount of fluid passing through the screen 24 due to the pressure differential device 50 may be controlled by the manner and/or the amount of the pressure differential applied.

In an embodiment, the screen 24 may have multiple sections 38A, 38B and 38C. Alternatively, the sections 38A, 38B and 38C may be portions or an entirety of individual and distinct screens, such as the screens 24A, 24B, 24C and 24D. Other embodiments may have more or fewer sections. The screen 24 may be formed from a composite material. Alternatively, the screen 24 may be formed from metal or a combination of metal and a composite material. Furthermore, the screen 24 may be flat or may utilize various surface profiles, such as a curved surface, for example.

The channels 36 may be fluidly connected to the bottom of the screen 24 and to the pressure differential device 50. Seals 40 may be provided to prevent leaks from the interface between the screen 24 and the channels 36. The seals 40 may be an elastomer that may be overmolded to the bottom of the screen 24. Alternatively, gaskets, o-rings, threaded connections and/or other sealing interfaces may be used to seal the screen 24 to the channels 36.

In an embodiment as depicted in FIG. 2B, three channels 36A, 36B and 36C are utilized. Each of the channels 36A, 36B and 36C may be operatively connected to a respective section 38A, 38B and 38C of the screen 24. The channel 36A is connected to the section 38A; the channel 36B is connected to the section 38B; and the channel 36C may be connected to the section 38C. In an embodiment, multiple channels may be used with one section. The sections 38A, 38B and 38C may comprise the entirety of one screen or, again, comprise a portion or entirety of different, distinct screens.

The channels 36A, 36B and 36C may each have a valve 42 to control flow through the channels 36A, 36B and 36C. Therefore, the pressure differential across the corresponding section 38A, 38B and 38C may be controlled. Each of the valves 42A, 42B and 42C may be connected in-line with a respective channel 36, such that the valve 42A is connected to the channel 36A, the valve 42B is connected to the channel 36B; and the valve 42C is connected to the channel 36C. In an embodiment, one of the valves 42A, 42B and 42C may be provided to control the pressure differential to two or even all of the channels 36A, 36B and 36C. For example, one of the valves 42A, 42B and 42C may be provided upstream of each of the channels 36A to control the pressure differential applied to each of the channels 36A, 36B and 36C. In such an embodiment, the other valves 42A, 42B and 42C may be eliminated, or may be provided in addition to the single valve to provide further control or manipulation of the pressure differential.

The valves 42A, 42B and 42C may be, for example, rotary valves, ball valves, globe valves, needle valves, butterfly valves, gate valves, plug valves, diaphragm valves, piston valves and/or the like. The valves 42A, 42B and 42C may be manually operated or may be remotely actuated.

The pressure differential across a section 38A, 38B and 38C may be pulsed, toggled and/or intermittently interrupted by opening and closing the one or more of the valves 42A, 42B and 42C. Manipulating the valves 42A, 42B and 42C by opening and/or closing the valves 42A, 42B and 42C at least partially, may disrupt the flow of fluid, air, and/or vapor through the sections 38A, 38B and 38C to affect the pressure differential across the screen 24.

Toggling or pulsing of the pressure differential, as used herein, refers to switching the pressure differential between two or more pressure values. In an embodiment, the pressure differential may be toggled between zero pressure differential and at least a partial pressure differential. In another embodiment, the pressure differential may be toggled between a first amount of pressure differential and a second amount of pressure differential greater than the first amount of pressure differential. Positive pressure may help to dislodge solids on the screen. In yet another embodiment, the pressure differential may toggle between more than two values.

Further, the amount of the pressure differential applied may be selected as desired. The amount of pressure differential applied may be a complete vacuum. The pressure differential may range from a maximum pressure differential value to a minimum pressure differential value and/or to zero. In an embodiment, the amount of pressure differential may be sufficient to stall the solids and/or the cuttings of the slurry on the screen 24. The amount of pressure differential may be insufficient to stall the solids and/or the cuttings of the slurry on the screen 24 while still increasing fluid flowing through the screen 24 as compared to the amount of fluid that would flow without use of the pressure differential device 50.

In an embodiment, a first amount of pressure differential may be applied at one of the sections 38A, 38B and 38C of the screen 24. A second amount of pressure differential may be applied to another of the sections 38A, 38B and 38C of the screen 24. Also, the first amount of pressure differential may be applied at one of the sections 38A, 38B and 38C of the screen 24, and the second amount of pressure differential may be applied to another of the sections 38A, 38B and 38C of the screen 24 at the same time or at different times. Further, the first amount of the pressure differential may be applied at one of the sections 38A, 38B and 38C of the screen 24 for a specific duration of time. The second amount of pressure differential may be applied to another of the sections 38A, 38B and 38C of the screen 24 for a specific duration of time that may be the same or different than the first duration of time.

In an embodiment, each of the valves 42A, 42B and 42C may be controlled independently. For example, any of the valves 42A, 42B or 42C may open and/or close irrespective of the position of any one or more of the other valves.

In an embodiment, the valves 42A, 42B and 42C may open and/or close so that at least one valve is open at any given time. In another embodiment, the valves 42A, 42B and 42C may be pulsed or toggled so that only one of the valves 42A, 42B and 42C may be open at any given time. Various duty-cycles may be utilized with respect to the amount of time each valve is opened and/or closed. In an embodiment, a five second duty-cycle may be used, for example.

One example of a valve duty-cycle may be summarized as follows:

| Time (seconds) | Valve 1 | Valve 2 | Valve 3 |
|---|---|---|---|
| 0 | Open | Closed | Closed |
| 5 | Closed | Open | Closed |
| 10 | Closed | Closed | Open |
| 15 | Open | Closed | Closed |
| 20 | Closed | Open | Closed |
| 25 | Closed | Closed | Open |
| 30 | Open | Closed | Closed |
| n | ... | ... | ... |

Furthermore, the valves 42A, 42B and 42C may be variably opened to allow a pressure differential of any level between zero and the maximum vacuum capability of the pressure differential device 50. Further, the multiple channels 36A, 36B and 36C may be connected to a single one of the sections 38A, 38B and 38C, to allow the same or different pressure differentials across portions of each of the sections 38A, 38B and 38C.

The control and manipulation of the pressure differential across the screen 24 may create a suck and release environment whereby the cuttings or solid material is temporarily stuck due to a first amount of pressure differential and then upon changing to a second amount of pressure differential (e.g. less than the first pressure differential), the cuttings or solid material may convey along the screen 24 toward the discharge end 32 of the shaker 20.

In another embodiment, the cuttings or solid material of the slurry may continually move toward the discharge end without interruption due to the pressure differential. In any of the embodiments disclosed herein, the pressure differential can advantageously be used to permit fluid or other material from passing through the screen 24 that would not pass through without use of the pressure differential. For example, additional liquid can be removed from solid drill cuttings, reducing the amount of fluid on cuttings. Such an improvement may permit disposal of the cuttings without further processing, less processing prior to disposal, or less cutting waste required for disposal.

The shaker 20 may have increased fluid capacity, increased fluid flow-through rates across the screens, and/or improved fluid removal efficiencies as a result of the system and method disclosed or readily understood by those having ordinary skill in the art based on this disclosure. In an embodiment, the pressure differential is applied only to the screen 24A nearest the discharge end 32. In another embodiment, the pressure differential is applied only to the screen 24D nearest the inlet end 30. In yet another embodiment, the pressure differential is applied to both the screen 24A and the screen 24D. In general, the pressure differential at the discharge end 32 can increase the dryness of the cuttings, and the pressure differential at the inlet end 30 may increase fluid capacity of the shaker 20. For example, applying the pressure differential to the screen 24A provides an optimal cleaning section for the material just before exiting the shaker 20. Most of the fluid separates from the solids when the material flows through the initial screens 24D, 24C and 24B located nearest the inlet end 30. Therefore, the screen 24A provides a final solid-removing step for the remaining material that has already passed through initial screens 24D, 24C and 24B, thereby providing improved shaker performance. That said, one of ordinary skill in the art will appreciate uses of the pressure differential on any single or combination of multiple screens of a shaker.

In another embodiment, for example, the pressure differential may be applied to the entirety of one or more of the screens 24A, 24B, 24C and 24D within the shaker 20. A combination of any of the pressure differential systems may be utilized.

Thus, the shaker 20 separates components of a slurry, having the screen 24 with the pressure differential to remove solids from the slurry. The pressure differential device 50 may provide a pressure differential across the screen 24 to cause fluid to flow through the screen 24. Also, a greater amount of fluid may flow through the screen due to the pressure differential as compared to the amount of fluid that may flow through the screen 24 without any pressure differential.

The screen 24 may have multiple sections 38A, 38B and 38C, for example. Each section 38A, 38B and 38C may have a corresponding channel 36A, 36B and 36C. The pressure differential across each section 38A, 38B and 38C may be independently toggled or pulsed by opening and closing the valve 42A, 42B and 42C on the corresponding section 38A, 38B and 38C.

The pressure differential across the screen 24 may pulse or toggle between two or more pressure values. In an embodiment, the pressure differential is pulsed or toggled between zero vacuum and at least a partial vacuum. In another embodiment, the pressure differential is pulsed or toggled between a positive pressure and at least a partial vacuum. The positive pressure may help to dislodge solids on the screen. In yet another embodiment, the pressure differential may pulse or toggle between more than two values.

In one embodiment, a pressure differential across a screen may be selectively applied to each of the sections 38A, 38B and 38C of the screen 24 wherein the pressure differential is applied across one section 38A, 38B and 38C at a time.

In another embodiment, the shaker 20 has multiple screens 24A, 24B, 24C and 24D and a pressure differential is provided across at least the screen 24A nearest the material output at the discharge end 32.

In another aspect, embodiments disclosed herein relate to a method for separating components of a slurry. The method provides a slurry to a top of the screen 24 and pulsing or toggling a pressure differential across a section 38A, 38B and 38C of the screen 24. The pressure differential across the screen 24 may be independently toggled for each of the sections 38A, 38B and 38C.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the present disclosure should be limited only by the attached claims.

The invention claimed is:

1. A method comprising:
providing a first screen adjacent to at least one second screen, wherein the first screen is partitioned into at least a first section and an adjacent second section;
providing a single sump below the first screen and the at least one second screen for collecting fluids that passes through the first screen and the at least one second screen;
operatively connecting a single pressure differential device to the first screen and the at least one second screen to provide at least a pressure differential between space above and space below the first screen such that fluids are flowable through the first section and the second section of the first screen to the single sump;
providing a slurry having fluids and solids onto the first screen;
applying a first pressure differential amount that is greater than zero to the first section of the first screen and applying simultaneously a second pressure differential amount that is greater than zero and different than the first pressure differential amount to the second section of the first screen; and
varying at least one of the first pressure differential amount and the second pressure differential amount to assist fluid flow of the slurry through the first screen, wherein the first pressure differential amount stalls solids of the slurry on the first screen and the second pressure differential amount permits the solids of the slurry to move across the first screen,
wherein the first pressure differential amount and the second pressure differential amount are generated by the single pressure differential device.

2. The method according to claim 1, further comprising:
connecting a first channel from the first section of the first screen to the pressure differential device.

3. The method according to claim 2, further comprising:
operatively connecting a first valve to the first channel and the pressure differential device, wherein the first valve toggles the first pressure differential amount at the first section of the first screen.

4. The method according to claim 2, further comprising:
connecting a second channel from the second section of the first screen to the pressure differential device.

5. The method according to claim 4, further comprising:
operatively connecting a second valve to the second channel and the pressure differential device, wherein the second valve toggles the second pressure differential amount at the second section of the first screen.

6. The method according to claim 1, further comprising:
maintaining the second pressure differential amount applied to the second section of the first screen while toggling the first pressure differential amount applied to the first section of the first screen.

7. The method according to claim 1, further comprising:
connecting channels respectively to the first and the second sections of the first screen; and
connecting a valve to one of the channels, wherein the valve toggles a pressure differential at one of the channels.

8. The method according to claim 1, further comprising:
decreasing or increasing at least one selected from the first pressure differential amount applied to the first section of first screen and the second pressure differential amount applied to the second section of the first screen.

9. The method according to claim 1, further comprising:
toggling the first and second pressure differential amounts independently.

10. The method according to claim 1, further comprising:
pulsing the first pressure differential amount for a first duration and the second pressure differential amount for a second duration, wherein the first duration and the second duration are different.

11. The method according to claim 1, further comprising:
interrupting at least one selected from the first and second pressure differential amounts by opening and closing a corresponding valve located between the pressure differential device and the first screen.

* * * * *